April 29, 1924. 1,491,866
F. R. KISSLING ET AL
COMBINED LIGHT AND VENTILATOR STRUCTURE FOR CLOSED AUTOMOBILES, ETC
Filed Jan. 12, 1923 3 Sheets-Sheet 2
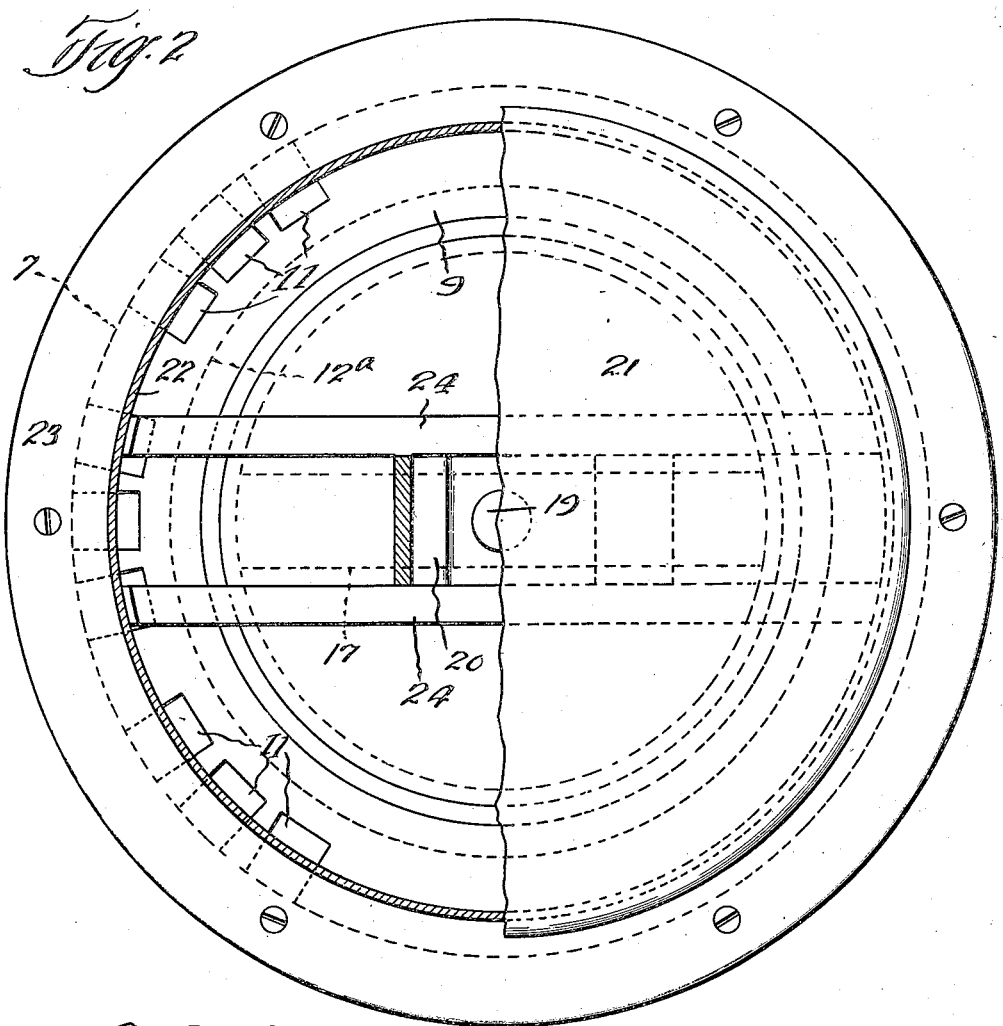
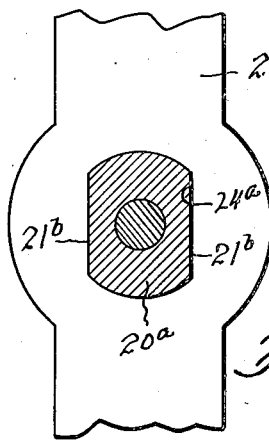
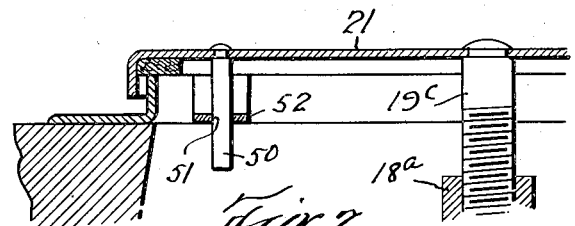
Inventors
F. R. Kissling
G. E. Wheeler
By John A. Bornhardt
Atty.

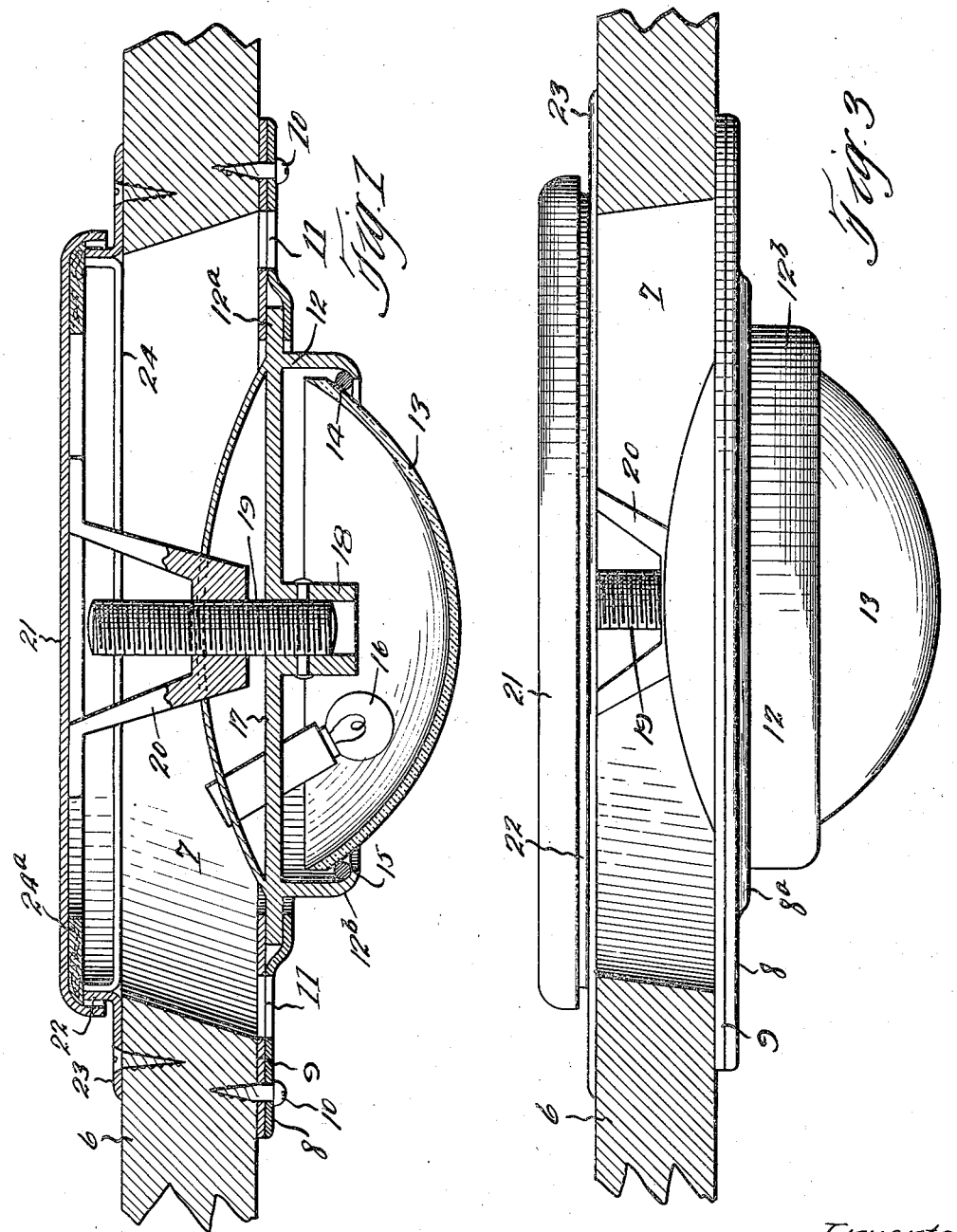

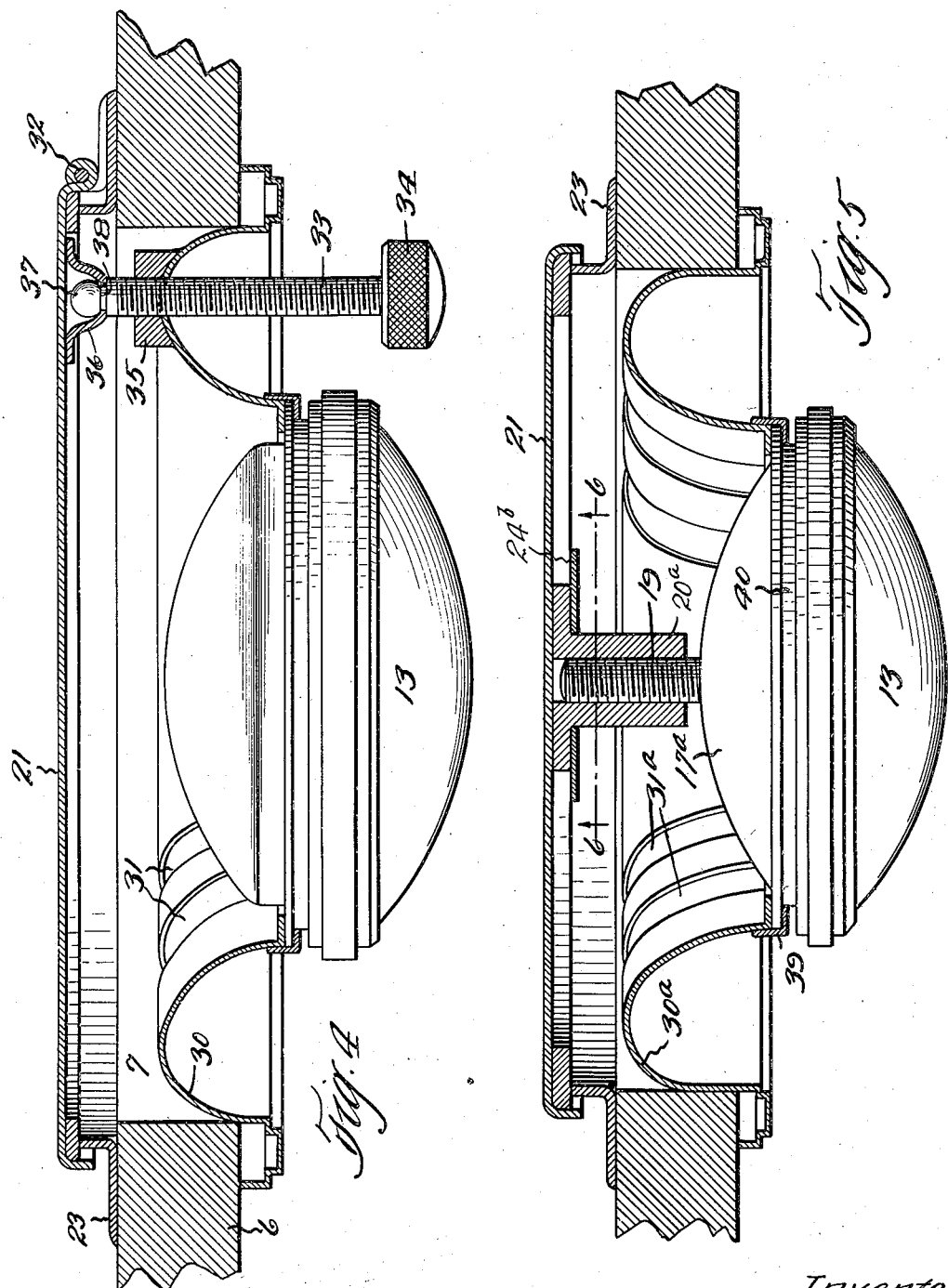

Patented Apr. 29, 1924.

1,491,866

UNITED STATES PATENT OFFICE.

FRANK R. KISSLING, OF CLEVELAND, OHIO, AND GARDNER E. WHEELER, OF NEW HAVEN, CONNECTICUT, ASSIGNORS TO THE WHEELER RADIATOR & MANUFACTURING CO., OF EAST CLEVELAND, OHIO, A CORPORATION OF OHIO.

COMBINED LIGHT AND VENTILATOR STRUCTURE FOR CLOSED AUTOMOBILES, ETC.

Application filed January 12, 1923. Serial No. 612,186.

*To all whom it may concern:*

Be it known that we, FRANK R. KISSLING and GARDNER E. WHEELER, citizens of the United States, residing, respectively, at Cleveland, in the county of Cuyahoga and State of Ohio, and New Haven, in the county of New Haven and State of Connecticut, have invented certain new and useful Improvements in Combined Light and Ventilator Structures for Closed Automobiles, Etc., of which the following is a specification.

This invention relates to a combined light and ventilator structure, particularly adapted and intended for use in closed automobiles or other vehicles although capable of use in other relations when desired.

The object of the invention is to provide an improved structure which can be inserted in the cover of a vehicle body or compartment, and which will contain electric lights for the purpose of illuminating the interior of the vehicle, and in addition to this will contain a ventilator which can be opened or closed, the ventilator including a cover on the outside over an opening in the roof.

The invention may be embodied in various forms some of which are hereinafter illustrated and described.

In the accompanying drawings, Fig. 1 is a vertical section of the device, Fig. 2 is a plan view partly in section, Fig. 3 is a side elevation, Fig. 4 is a vertical section of a modification, Fig. 5 is a vertical section of another modification. Fig. 6 is a vertical section on the line 6—6 of Fig. 5 and Fig. 7 is a fragmentary sectional view of another modification.

In the drawings, 6 indicates the roof of a car or other structure, provided with an opening 7.

Secured to the under side of the roof and extending around said opening is a pair of ring plates 8 and 9, secured by screws 10 and provided with a series of ventilating holes 11 which permit the flow of air from the interior of the vehicle to the opening 7.

The light support or holder includes a ring 12 having a horizontal flange 12ª the edge of which is frictionally held between the inside edges of the two plates 8 and 9, which are expanded or spread apart to receive the same, as indicated at 8ª, and the ring 12 has a vertical depending flange 12ᵇ which holds the dome glass 13 by means of a retainer 14 and a bead 15 on the flange 12ᵇ, the retainer being inserted between the glass and the bead. The ring and glass enclose one or more electric lamps 16 the sockets for which are fitted in a plate 17, which is fastened to or formed integral with the ring 12. The plate 17 has a central socket 18 into which is screwed or otherwise fastened the lower end of a screw 19, and this screw engages a threaded yoke or bracket 20 the arms of which are fastened to a ventilator cover plate 21 which is dished to engage over the flange 22 of a ring 23 secured to the vehicle top and extending around the opening 7, this ring and ventilator cover being positioned on the outside of the roof. A pair of straps 24 extending across the opening between opposite sides of the ring 23 and these form guides for the yoke 20 which works therebetween, the yoke being permitted to raise and lower but being prevented from rotation by the straps.

In use the structure will serve the purpose of a dome light and also that of a ventilator when desired. To open the ventilator cover 21 the ring 12 is grasped and turned, thereby also turning the screw 19, and this screw by its engagement with the threaded part of the yoke 20 will lift the ventilator cover, thereby permitting the escape of air through the holes 11, the opening 7, and outwardly under the edge of the cover. Reverse operation of the ring 12 will close the ventilator cover, which is provided with a packing ring 24ª which seats tightly against the flange 22 of the outer ring, makes the joint water-tight.

In the modified form shown in Fig. 4 the structure is much the same, the dome light however being supported in a fixed position by means of a shaped shell ring 30 having openings 31 for the passage of air, and the ventilator cover, instead of being operated by a central screw in the manner above described, is hinged as indicated at 32 to the top of the car and opened and closed by a screw 33 having a knob 34 inside the car and tapped through a threaded boss 35 on the plate 30 and engaging a socket piece 36 on the under side of the cover by means of a ball 37 with a neck 38 around which the edge of the socket fits. By turning the screw 33 the ventilator cover can be opened or closed, this action being permitted by the ball and socket connection and the hinge.

The modified form shown in Fig. 5 is similar to that shown in Fig. 1 with respect to the central screw 19 which is connected to the lamp holder, by turning which the cover will be raised and lowered, but instead of the supporting plates 8 and 9 the lamp structure is rotatably held by an ornamental pressed shell 30$^a$ having slits 31$^a$ for the escape of air, the lamp structure being supported for rotation by a flanged ring 39 secured to the edge of the shell 30$^a$ and engaging in a cover 40 in the ring which supports the globe 13 and the socket plate 17$^a$.

The screw 19 threads into an extension 20$^a$, which is fastened to the cover 21, and has the flattened side 20$^b$. Then extension 20$^a$ extends downwardly through a correspondingly shaped opening 24$^a$ in a cross piece 24$^b$ which is used in this form, in plan of the cross piece 24 shown in Figs. 1 and 2. This construction prevents turning of the member 20$^a$ when the screw 19 is rotated.

In the form shown in Fig. 7, the screw 19$^c$ is fastened rigidly to the top 21 and threaded into the boss 18$^a$ pins 50 fastened to the top 21 and projecting downwardly therefrom through holes 51 in cross piece 52 prevent the top 21 and screw 19$^c$ from rotating when the ring 12 is turned.

The shapes and manner of assembly of the various parts are largely matters of choice and various other modifications are possible within the scope of the following claims.

We claim:

1. A combined light and ventilator structure adapted to be located in an opening in a roof or the like comprising a lamp support set in said opening, the ventilator including a cover extending over said opening, and means extending below the lamp support to raise or lower said cover.

2. A combined light and ventilator structure adapted to be located in an opening in a roof or the like comprising a lamp support set in said opening, the ventilator including a cover extending over said opening, and means extending below the cover to raise or lower said cover, said means including a screw operatively connected to the cover.

3. A combined light and ventilator structure adapted to be located in an opening in a roof or the like comprising a lamp support set in said opening, the ventilator including a cover extending over said opening, and means extending below the cover to raise or lower said cover, the roof being provided with an outer ring surrounding the opening against which ring the cover closes when lowered.

4. In a combined dome light and ventilator, a supporting plate secured to the inside of the roof and having openings communicating with an opening in the roof, a lamp structure carried by said plate, a cover on the outside of the roof, extending across said opening, and means extending through said opening for raising and lowering the cover.

5. In a combined dome light and ventilator, a supporting plate secured to the inside of the roof and having openings communicating with an opening in the roof, a lamp structure carried by said plate, a cover on the outside of the roof, extending across said opening, and means extending through said opening for raising and lowering the cover, said means including a screw operatively connected to the cover and carried by the light structure.

6. A combined light and ventilator adapted to be applied to an opening in a roof, and comprising a supporting plate provided with air holes, a lamp and dome-glass holder mounted on the said plate, a cover plate extending across said opening on the outside of the roof, and a screw connected to said cover to raise and lower the same.

In testimony whereof, we affix our signatures.

FRANK R. KISSLING.
GARDNER E. WHEELER.